United States Patent [19]

Wakita et al.

[11] Patent Number: 4,705,365
[45] Date of Patent: Nov. 10, 1987

[54] LIGHT DEFLECTING APPARATUS

[75] Inventors: Naomasa Wakita; Makoto Okuda, both of Aichi, Japan

[73] Assignee: NGK Spark Plug Co., Ltd., Aichi, Japan

[21] Appl. No.: 803,734

[22] Filed: Dec. 2, 1985

[30] Foreign Application Priority Data

Dec. 1, 1984 [JP] Japan .................. 59-254813
Dec. 6, 1984 [JP] Japan .................. 59-258170

[51] Int. Cl.$^4$ .......................... G02B 26/08
[52] U.S. Cl. .......................... 350/487
[58] Field of Search ............... 350/486, 487, 611, 622, 350/632

[56] References Cited

U.S. PATENT DOCUMENTS 4,060,314 11/1977 Heinz .................. 350/486
4,203,654 5/1980 Ellis .................... 350/487
4,577,131 3/1986 Soobitsky ............ 350/487
4,660,941 4/1987 Hattori et al. ....... 350/487

FOREIGN PATENT DOCUMENTS

0177316 9/1985 Japan .................. 350/487
2417000 10/1974 PCT Int'l Appl. .... 350/487
2092770 8/1982 United Kingdom ... 350/487

Primary Examiner—John K. Corbin
Assistant Examiner—Vincent J. Lemmo
Attorney, Agent, or Firm—Finnegan, Henderson, Farabow, Garrett and Dunner

[57] ABSTRACT

A light deflector comprising a reflective mirror having a specular surface on top. A flexible supporting plate is retained along its periphery and supports the reflective mirror in an oscillatory manner. The reflective mirror is supported on a point from below by way of the flexible supporting plate. A pair of piezoelectric laminates are disposed at locations that on x- and y-axes through the fulcrum intersecting at right angles in a plane and are distant from the fulcrum. The piezoelectric laminates are capable of expansion and contraction in the direction of z-axis upon application of a voltage to the laminates. The reflective mirror is supported on a point from below by the displacing end of each of laminates.

2 Claims, 12 Drawing Figures

LIGHT DEFLECTING APPARATUS

BACKGROUND OF THE INVENTION

The present invention relates to a light deflector for causing incident light to be deflected in a desired direction by tilting a reflective mirror in the direction of x-or y-axis in a plane in response to an applied electrical signal. More particularly, the present invention relates to such a light deflector that can be used in projecting an image in the space by causing an abrupt change in the direction in which a laser light travels.

Figure 1:
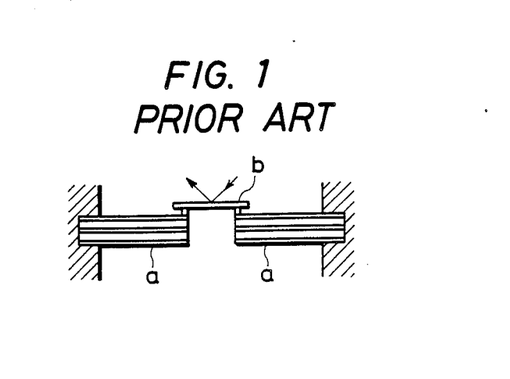
FIG. 1 is a side elevational view of a conventional light deflector.

A light deflector for tilting a reflective mirror by means of bimorph cells is disclosed in Japanese Patent Publication No. 40215/1977. FIG. 1 is a diagrammatic cross section of this conventional light deflector; a pair of bimorph piezoelectric cells a which will bend upon voltage application are fixed at one end and connected at the other end to the periphery of the bottom of a reflective mirror b for supporting the same; the mirror b is caused to tilt by the bending action of each bimorph cell a.

In the arrangement described above, the reflective mirror b and the piezoelectric cells a are supported only by means of fixing the cells at one end. This arrangement is weak and the piezoelectric cells a may easily break if an external force is concentrated in the center. If the thickness of the reflective mirror b is reduced to ensure the application of a minimum load on the cells a, the physical strength of the mirror b is also reduced to present considerable difficulty in handling. The amount of tilting of the mirror b is determined by many factors such as the voltage applied to the cells a, the distance between the fixed end of each cell and the periphery of the mirror b on which it is supported by the cells, and the weight of the mirror b, and because of this complexity in determinants, it is substantially difficult to achieve the desired precision in tilting position. A further disadvantage results from the fact that the center load of the mirror b will prevent it from being tilted to a great extent.

SUMMARY OF THE INVENTION

In order to solve the aforementioned problems, the present invention provides a light deflector comprising a reflective mirror having a specular surface on top, a flexible supporting plate that is retained along its periphery and which supports said reflective mirror in an oscillatory manner, said reflective mirror being supported on a point from below by way of said flexible supporting plate, a pair of piezoelectric laminates being disposed at locations that lie on x- and y-axes through the fulcrum intersecting at right angles in a plane and which are distant from said fulcrum, said piezoelectric laminates being capable of expansion and contraction in the direction of z-axis upon application of a voltage to the laminates, said reflective mirror being supported on a point from below by the displacing end of each of said laminates.

When electrical signals are applied to the piezoelectric laminates lying on x- and y-axes so as to cause distortions in z-axis, the displacement ends of the respective piezoelectric laminates will move to cause a three-dimensional tilting displacement of the reflective mirror in a predetermined direction about the fulcrum.

According to another aspect of the invention, a fixed mirror is provided with a specular surface on bottom and is positioned above and in a face-to-face relationship with a reflective mirror.

When an electrical signal is applied to the piezoelectric laminates on x- and y-axes so as to produce a deformation in the direction of z-axis, the displacement end of each laminate is moved, whereby the reflective mirror is caused to experience a three-dimensional tilting movement about the fulcrum in a predetermined direction. A light incident upon the reflective mirror is reflected a number of times between the reflective mirror and the fixed mirror until it emerges from the gap between the two mirrors.

DESCRIPTION OF THE PREFERRED EMBODIMENTS

An embodiment of the present invention is hereunder described with reference to the accompanying drawings.

Figure 2:
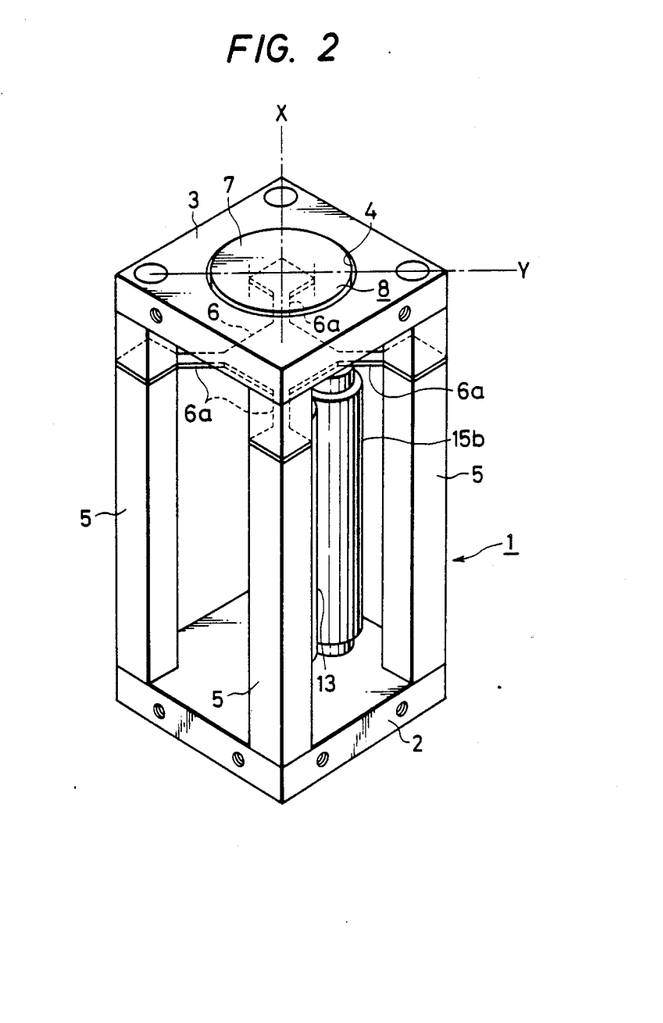
FIG. 2 is a perspective view of the light deflector according to one embodiment of the present invention.
Figure 3:
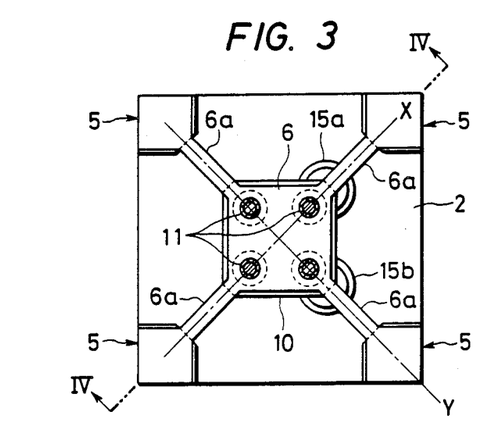
FIG. 3 is a cross section of FIG. 4 taken on line III—III.

FIG. 2 shows a housing 1 which consists of a square bottom plate 2 and an identically shaped top plate 3 having a center circular hole 4, with the two plates being connected together at the four corners by means of four columns 5. As shown in FIG. 3, the columns 5 hold legs 6a projecting from the four corners of a metallic square flexible supporting plate 6. The flexible support plate 6 is not held taut and permits vertical movement. A reflective mirror 8 is loosely fitted in the circular hole 4; a boss 9 fixed to the bottom of the mirror 8 rests on top of the plate 6, and the specular surface 7 of the mirror 8 is exposed on top of the housing 1. A backing plate 10 is positioned in contact with the underside of the plate 6, and is connected to the plate 6 and the boss 9 by means of screws 11 that are threaded from below the backing plate 10. This backing plate 10 is made of a wear-resistant hard metallic material. Such a material may be used in only the areas of the backing plate in which it will contact balls 14 and 16 to be described later.

Figure 4:
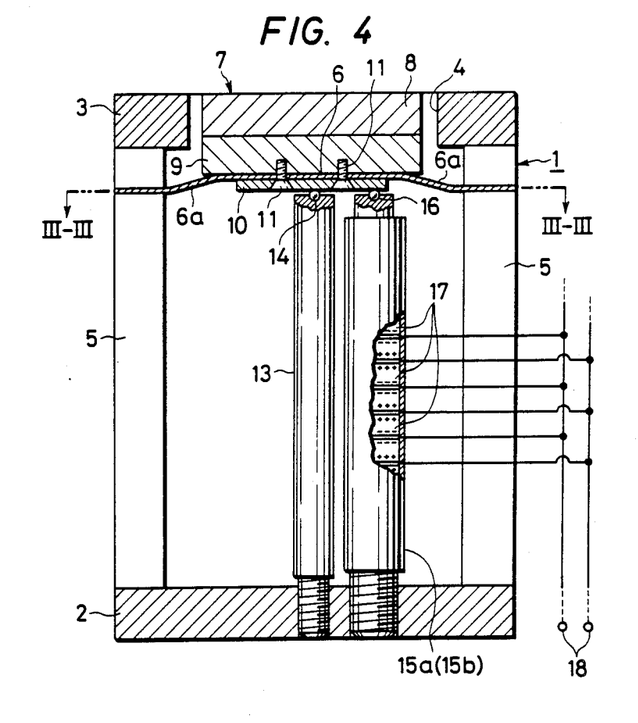
FIG. 4 is a longitudinal section of FIG. 3 taken on line IV—IV.

A supporting column 13 is erected vertically from the center of the bottom plate 2. A contact ball 14 made of a wear-resistant hard metallic material and positioned on top end of the column 13 is placed in contact with the underside of the central portion of the baking plate 10, whereby the reflective mirror 8 is supported in such a manner that the specular surface 7 is generally flush with the top face of the housing 1. As shown in FIG. 4, the plate 6 is slightly elevated in comparison with the legs 6a to position the mirror 8 slightly above the top of the housing.

Figure 6:
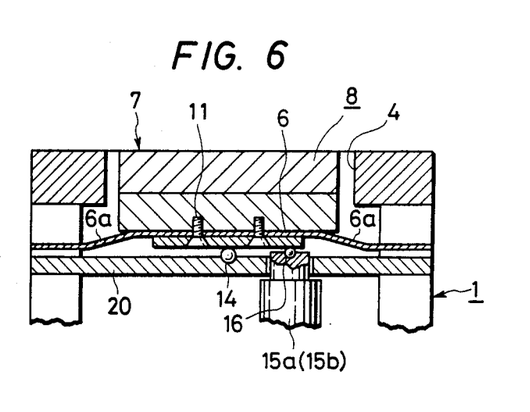
FIG. 6 is a partial side elevation view showing an alternative means for supporting the center of the reflector mirror 8.

The center of the mirror 8 need not be supported by the column 13, and instead, as shown in FIG. 6, it may be supported on a point by a contact ball 14 that is provided in the center of an intermediate plate 20 supported on its periphery by the column 5.

Figure 7A:
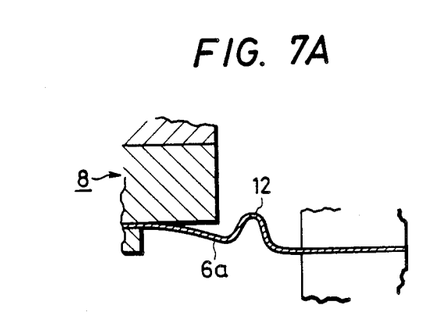
FIGS. 7A and 7B are side views of legs 6a provided with bending wrinkles.
Figure 7B:
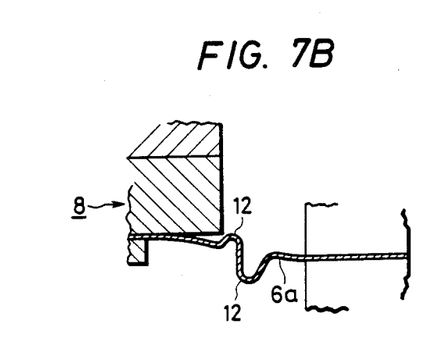

Each of the legs 6a extending from the flexible supporting plate 6 may be provided with one or more bending wrinkles 12 as shown in FIGS. 7A and 7B. The wrinkles will facilitate the deformation of the legs 6a and, hence, the installation of the flexible plate 6 and its tilting movement to be described later in this specification.

On the bottom plate 2 are provided two vertical columnar piezoelectric laminates 15a and 15b that are positioned on x- and y-axes intersecting with each other at right angles in the same plane and passing through the center of the column 13. A contact ball 16 (displacement end) made of the same wear-resistant hard metallic material as the material of which the ball 14 is made is provided on top end of each of the piezoelectric laminates 15a and 15b, and these balls make point contact with the underside of the backing plate 10 at positions in alignment with the x- and y-axes in the plane formed by said underside of the backing plate.

As shown in FIG. 4, each of the piezoelectric laminates 15a and 15b consists of a plurality of piezoelectric elements 17 that are polarilized at vertically opposite sides and which are laminated one on top of another in such a manner that two sides of the same polarity will face each other. When a voltage is applied to two input terminals 18, 18, one being connected to the electrodes of one polarity and the other being connected to those of the opposite polarity, the individual piezoelectric elements 17 will deform in the vertical direction and the total strain of the elements will cause either expansion or contraction of each of the piezoelectric laminates 15a and 15b in the vertical direction.

Figure 5:
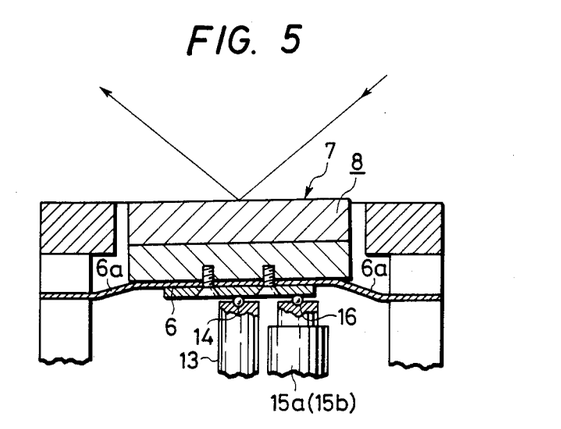
FIG. 5 illustrate the deflector in action as seen in the cross section of FIG. 3.

The action of mechanism of the embodiment shown above is hereunder described in greater detail with reference to FIGS. 4 and 5.

In the absence of any signal voltage to the piezoelectric laminates 15a and 15b, the reflective mirror 8 is positioned as shown in FIG. 4 where the specular surface 7 is flush with the top face of the top plate 3. In order to deflect incident light on the mirror 8 by a certain amount, the necessary amount of signal voltage is applied between the input terminals 18 connected to the piezoelectric laminates 15a and 15b. This will cause the piezoelectric laminate 15a (or 15b) to expand as shown in FIG. 5. Since the underside of the center of the mirror 8 is supported on a point by means of contact with the ball 14 lying on top of the column 13 and since the flexible supporting plate 6 positioned between the mirror 8 and the ball 14 is capable of tilting by means of deformed legs 6a, the expanding laminate 15a (or 15b) will cause the mirror 8 to tilt about the ball 14 by an angle that is proportional to the applied signal voltage, whereby the specular surface 7 will tilt by a predetermined angle in the x- (or y-) axis in which the piezoelectric laminate 15a (or 15b) is positioned. As a result, the incident light is reflected from the specular surface 7 in the desired direction.

When the piezoelectric laminate 15a (15b) is released from the state of expansion, the spring action of the legs 6a that will cause them to return to their initial position shown in FIG. 4, as combined with the weight of the reflective mirror 8, will permit the mirror 8 to follow the contracting movement of the piezoelectric laminate 15a (or 15b) until it returns to its initial position.

Therefore, the tilting of the specular surface 7 in the direction of x-axis is controlled by the expansion and contraction of the piezoelectric laminate 15a, while the tilting of the specular surface in the direction of y-axis is controlled by the expansion and contraction of the laminate 15b.

The piezoelectric laminates 15a and 15b may be provided with different amounts of expansion and contraction, or with different timings of such movements by means of applying different amounts of signal voltage to these laminates. By combining suitably selected amounts of displacements or timings thereof, a certain range of tilting angles are produced in association with the applied values of signal voltage, so that the reflective mirror 8 will oscillate three-dimensionally to deflect the specular surface 7 in a desired direction with respect to the incident light. Therefore, the deflector of the present invention will ensure good angular response to high-frequency input waves such as light pulses.

In the embodiment shown above, the reflective mirror 8 is supported by the combination of the flexible plate 6, backing plate 10 and contact ball 14, and can be easily assembled with these components without welding. The absence of the need for welding the mirror 8 to these components at the necessary supporting areas will also permit frequent tilting of the mirror 8 without causing its inadequate supporting due to fatique.

As is apparent from the foregoing description, according to the present invention, the reflective mirror 8 having the specular top surface 7 is supported on a point, and the two piezoelectric laminates 15a and 15b that are disposed at locations that lie on x- and y-axes through the fulcrum intersecting at right angles in a plane and which are distant from said fulcrum, will expand or contract in the vertical direction so as to cause the specular surface 7 to tilt about the fulcrum. Because of this arrangement, the amount of displacement of the specular surface 7 will not be affected by such parameters as the load exerted on said surface and the overall system will be provided with sufficient strength to withstand operations under hostile conditions. As a further advantage, a high positional precision and a great latitude in the amount and direction of the tilting of the specular surface can be provided by varying the voltage to be applied to the piezoelectric laminates 15a and 15b.

Another embodiment of the invention will be described with reference to FIGS. 8 to 11.

Figure 8:
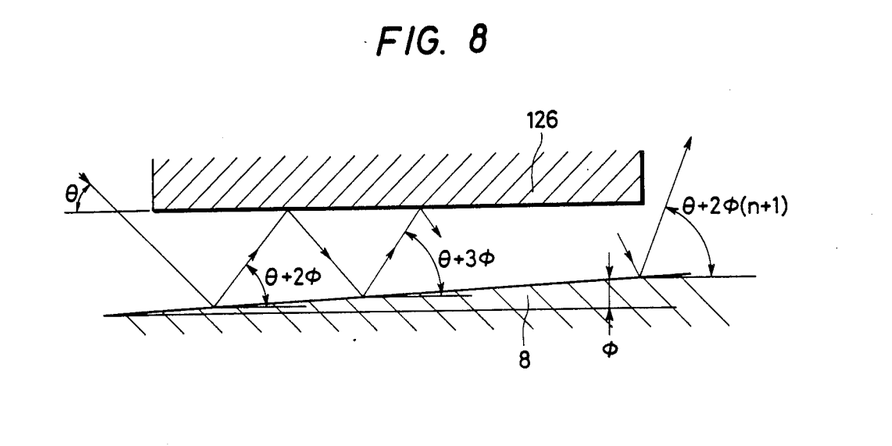
FIG. 8 is a sketch illustrating the principle of another embodiment of the present invention.

If, as shown in FIG. 8, the reflective mirror 8 is inclined at an angle $\phi$, the incident light falls on the deflector at a constant angle $\theta$, and if the light if reflected from the fixed mirror 126 by a number n, the angle at which the light emerges or radiates from the deflector is expressed by $\theta \pm 2\phi(n+1)$, which represents the angle of deflection. In this expression, selection of the plus or minus sign depends on the direction in which the reflective mirror is inclined, and the positive sign is selected if it is inclined as shown in FIG. 8 where the gap between the two mirrors decreases toward the end at which the light emerges.

In the absence of any fixed mirror, the angle of deflection will be $2\phi$, and this means that the fixed mirror 126 amplifies the possible angle of deflection by a factor of $(n+1)$ because $2\phi(n+1)/2\phi = n+1$. As a result, a small displacement in the angle of inclination of the reflective mirror will produce a great angle of radiation.

The essential parts of the light deflector of this embodiment are hereunder described in which the same reference numerals denote the like components shown in FIGS. 2 to 8.

Figure 9:
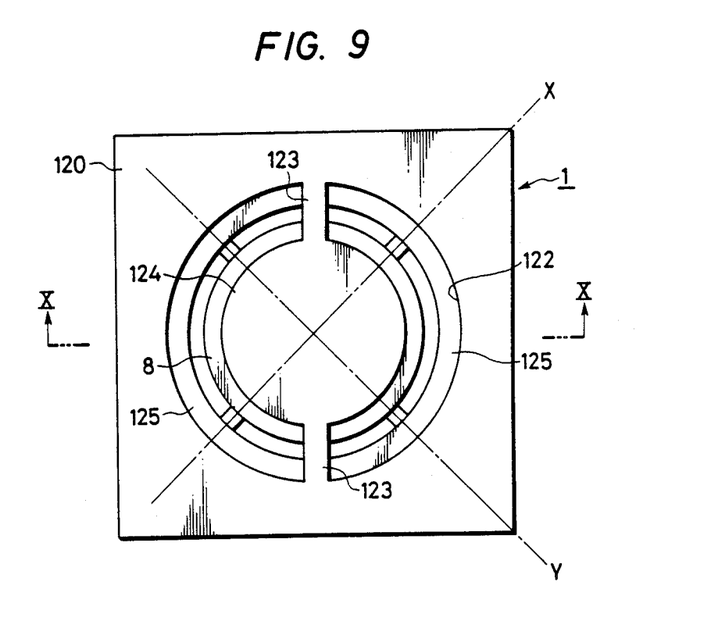
FIG. 9 is a plan view of the light deflector according to the embodiment using the principle shown in FIG. 8.
Figure 10:
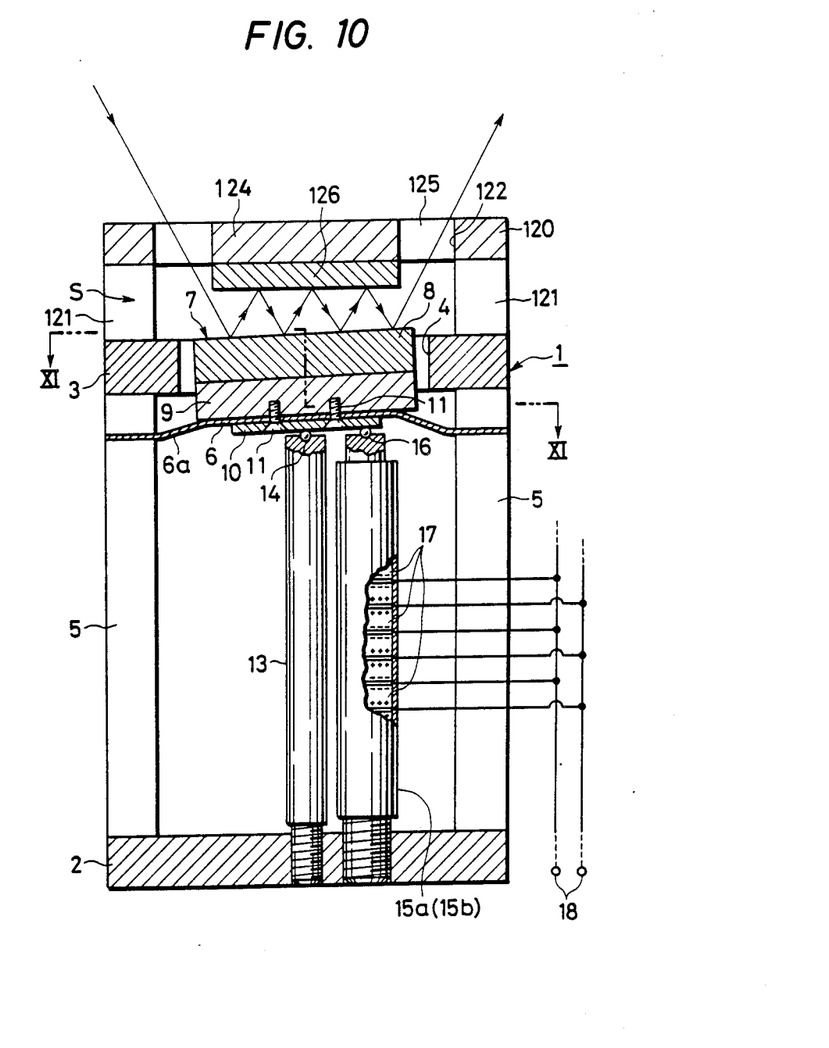
FIG. 10 is a longitudinal section of FIG. 9 taken on line X—X.
Figure 11:
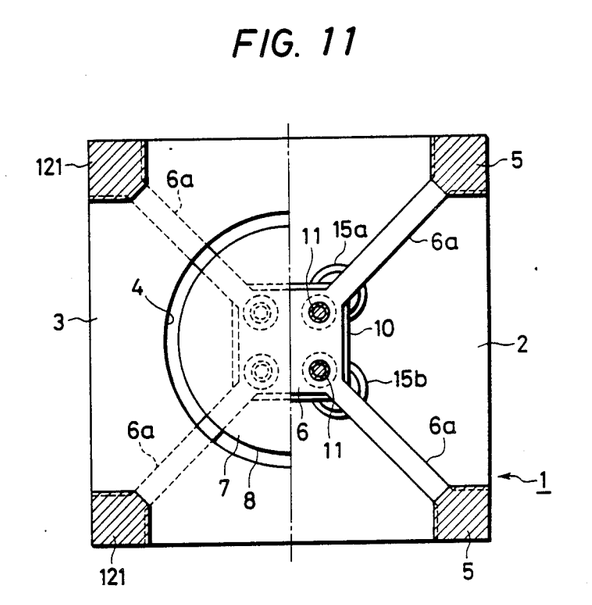
FIG. 11 is a cross section of FIG. 10 taken on lines XI—XI.

Above the top plate 3 is positioned a mirror holding plate 120 with a predetermined gap S being provided therebetween, and this plate 120 is supported by small columns 121 disposed under said plate at the four corners.

The mirror holding plate 120 is provided with a large circular hole 122 that receives a disk 124 whose center aligns with that of the reflective mirror 8 and which is supported by bridges 123 spanning the gap between the disk 124 and the plate 120. The outside diameter of the disk 124 is smaller than the inside diameter of the circular hole 122 so that an annular slit 125 is formed around the disk 124. A fixed mirror 126 is secured to the underside of the disk 124 in such a manner that it will face the top side of the reflective mirror 8.

The mirror holding plate 120 may be detachably connected to the top plate 3 by a certain simple device.

When light emitting from a source at a predetermined position falls on the deflector, it passes through the annular slit 125, and is reflected from the inclined mirror 8 and reciprocated between the fixed mirror 126 and the reflective mirror 8 predetermined times before it radiates from the slit 125. The radiated light will project a spot of light on a separately disposed screen.

As will be apparent from the foregoing description, the light deflector of the present invention employs the combination of the reflective mirror 8 and the overlying fixed mirror 126 with a view to attaining a greater displacement in the optical path than is achieved by the inclination of the reflective mirror alone. This will therefore provide the following advantages.

(a) In order to provide a greater angle of radiation from the conventional system, larger amounts of expansion and contraction must be produced by the piezoelectric laminates. However, because of the limit put on the maximum amount of expansion that can be achieved by a single piezoelectric element, this need cannot be satisfied without using an increased number of piezoelectric elements, which will in turn result in a bulky and expensive appartus. The present invention solves this problem by the mere use of the fixed mirror 126.

(b) A larger image can be projected on a screen than is produced with the conventional system which does not use the fixed mirror 126.

(c) By means of fine control of the voltage applied to the piezoelectric laminates, the system of the present invention is capable of reproducing information on the same area of screen in an amount several times the value attained by the conventional system which does not use the fixed mirror 126.

(d) By detachably mounting the fixed mirror 126, image size selection can be made since a small image is projected when this mirror is detached and an enlarged image is reproduced when the mirror is replaced.

We claim:

1. A light deflector comprising: a supporting member, a fulcrum disposed on said supporting member, a reflective mirror having a specular surface on top, a flexible supporting plate that is retained along its periphery and engages said fulcrum substantially at the center of said plate, said plate for supporting said reflective mirror from below in an oscillatory manner, a pair of piezoelectric laminates being disposed at locations on x- and y-axes that pass through the fulcrum, said x- and y-axes intersecting at right angles in a plane, and being disposed at a distance from said fulcrum, said piezoelectric laminates being capable of expansion and contraction in a z-axis direction that is perpendicular to said x- and y-axes upon application of a voltage to the laminates, to oscillate said reflective mirror from below about said fulcrum.

2. A light deflector according to claim 1, further including a fixed mirror disposed above and in a face-to-face relationship with said reflective mirror.

* * * * *